United States Patent [19]

Kinney et al.

[11] Patent Number: 4,532,710
[45] Date of Patent: Aug. 6, 1985

[54] DISTANCE MEASURING DEVICE FOR GOLF CARTS AND THE LIKE

[75] Inventors: Philip C. Kinney; Mir Imran; Edward J. Donnelly, all of Pittsburgh, Pa.

[73] Assignee: Phyronics, Inc., Pittsburgh, Pa.

[21] Appl. No.: 637,701

[22] Filed: Aug. 6, 1984

Related U.S. Application Data

[63] Continuation of Ser. No. 380,239, May 20, 1982, abandoned.

[51] Int. Cl.³ .................. G01B 3/12; G01C 22/00
[52] U.S. Cl. ................. 33/141 E; 33/DIG. 1; 235/95 R
[58] Field of Search ........... 33/141 R, 141 E, 142, 33/DIG. 1, DIG. 3; 235/95 R, 95 B, 96

[56] References Cited

U.S. PATENT DOCUMENTS

| | | | |
|---|---|---|---|
| 2,557,450 | 6/1951 | Mentzel | 235/92 DN |
| 2,711,027 | 6/1955 | Williamson | 33/141 R |
| 2,766,935 | 10/1956 | Klein | 235/95 R |
| 3,441,209 | 4/1969 | Farman | 235/95 R |
| 3,629,557 | 12/1971 | Lareau | 235/95 R |
| 3,696,510 | 10/1972 | Evans, Jr. | 33/141 R |
| 3,824,694 | 7/1974 | Lesperance et al. | 33/141 R |
| 4,044,471 | 8/1977 | Peterson | 33/141 R |
| 4,103,332 | 7/1978 | Floyd et al. | 364/449 |
| 4,171,575 | 10/1979 | Blessing et al. | 33/141 E |
| 4,176,397 | 11/1979 | Crom et al. | 235/95 R |
| 4,176,458 | 12/1979 | Dunn | 33/141 E |
| 4,308,665 | 1/1982 | Losch | 33/141 E |
| 4,377,850 | 3/1983 | Simpson | 33/142 |
| 4,383,301 | 5/1983 | Morita et al. | 33/141 E |

FOREIGN PATENT DOCUMENTS

| | | | |
|---|---|---|---|
| 2619624 | 3/1978 | Fed. Rep. of Germany | 33/141 E |
| 2034085 | 5/1980 | United Kingdom | 33/141 R |

*Primary Examiner*—Richard R. Stearns
*Attorney, Agent, or Firm*—Fleit, Jacobson, Cohn & Price

[57] ABSTRACT

A measuring device for use in golfing is disclosed. The device employs a fixed diameter measuring wheel, a magnetic revolution sensor, and a solar powered digital display to measure and display distance travelled by the wheel. Display and counter are reset to zero through the use of a phototransistor reset sensor. The device is rapidly connectable and disconnectable from a golf cart, and thus is portable. It is precalibrated, and is readily adaptable for use with a hand-pulled or a motorized golf cart. Attachment of the device to an extension handle rather than a golf cart converts it for use in an independent manual mode. In a further embodiment of the measuring device, the device is programmable by the user to receive and store data corresponding to a measured dimension of the wheel, and is provided with electronics circuitry for measuring the distance travelled by the golf cart in consecutive increments in response to each consecutive revolution of the wheel.

6 Claims, 6 Drawing Figures

U.S. Patent   Aug. 6, 1985   Sheet 2 of 3   4,532,710
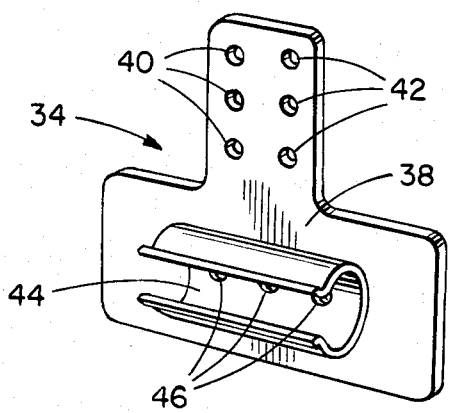
FIG. 4
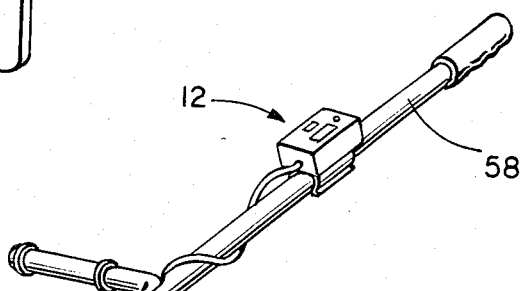
FIG. 5
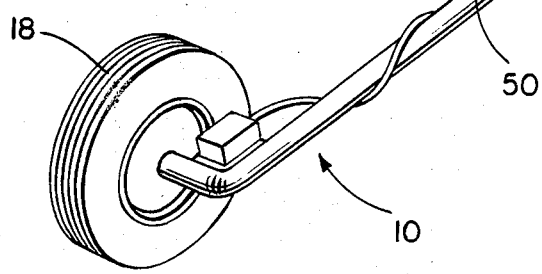
FIG. 3
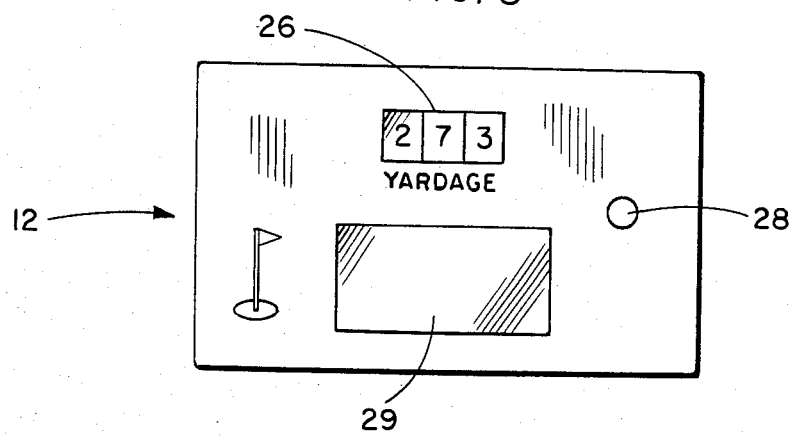

DISTANCE MEASURING DEVICE FOR GOLF CARTS AND THE LIKE

This application is a continuation of application Ser. No. 380,239, filed May 20, 1982, now abandoned.

BACKGROUND OF THE INVENTION

1. Field of the Invention

This invention relates to distance measuring device in general, and particularly to improvements in distance measurement attachments for golf carts. More specifically, this invention relates to the class of device which employs a rolling contact with the surface to be measured, and which electronically displays the distance measured at a location convenient to the user; the device of the invention is readily attached and detached from the golfing equipment.

2. Description of the Prior Art

The prior art has many examples of distance measuring instruments including those used with golfing equipment. U.S. Pat. No. 3,441,209 issued to C. E. Farman on April 29, 1969 describes a golf cart measuring device which mechanically counts the revolutions of a wheel and displays the result on a dial on the golf cart handle. 0. F. Peterson, in U.S. Pat. No. 4,044,471, describes a similar device which operates by means of a gear attached to the wheel of the golf cart. Again, the resulting distance measurement is displayed on a dial mounted on the handle of the golf cart.

The use of digital readout electronic counters also is known in the prior art. C. H. Dunn, in U.S. Pat. No. 4,176,458, describes a distance measuring apparatus for use to find indoor measurements. The device operates by electronically sensing the revolutions of a wheel and transmitting the sensed information to a digital display mounted on the handle of the device. British patent application No. 2,034,085 describes a measuring instrument where a magnetic sensor is used to detect the passage of a magnet mounted on a wheel of a piece of agricultural equipment. The impulse generated by the sensor is then sent to an electronic digital calculator which accumulates the resulting distance measured.

Notwithstanding the known prior art, there remains a need for golf cart adapted devices that are small, inexpensive, easily moved from one golf cart to another, and yet effective for measuring distance. The present invention is directed to such a device.

SUMMARY OF THE INVENTION

The present invention has an advantage over the prior art in that it is precalibrated and self-contained. The combination of a matched fixed diameter measuring wheel, a magnetic sensor, and a digital readout avoids the necessity of calibration upon installation. This has the further advantage of making the device portable; since no recalibration is required, the device can be detached from one golf cart and placed on another with a minimum of effort. Further, since the unit is self contained, it may even be used on a rented golf cart.

Additional advantages result from the use of a magnet and a magnetic sensor. Reliability and life of the golf cart unit will be prolonged since the device does not rely on mechanical contact or on light reflection. Therefore, dirt, water, and other debris will not effect the sensing operation. The use of a phototransistor to reset the counter and display to zero will also enhance reliability due to the absence of moving parts subject to wear.

Further advantages over the prior art result from the use of solar cells to power the device, thereby removing reliance on batteries which are subject to periodic replacement. Provision of solar power renders the device substantially maintenance free.

The device as constructed can be readily converted to use in an independent hand operated mode. By the simple attachment of a walking handle, the golfer can use the device to measure distances independent from a golf cart.

A further embodiment of the present invention makes it possible to program the device for utilization with any size wheel of a golf cart. Specifically, in accordance with the further embodiment of the invention, a programmable electronics unit is provided, which programmable electronics unit is pre-programmed by the user with the measured circumference of a wheel of the golf cart. Then, as described in detail below, the electronics unit proceeds, during operation of the golf cart, to measure and display the distance covered by the golf cart. A primary advantage of this embodiment of the invention resides in the fact that, since programmable electronics circuitry of low power consumption is being employed, battery power will suffice, and a solar cell arrangement is not necessary.

Therefore, a primary object of the present invention is to provide a readily portable distance measuring device for golfers.

Another object of the present invention is to provide an inexpensive and yet effective means for the golfer to measure distances.

Still another object of the present invention is to provide a device which has simplified circuitry and few moving parts, so that such device has increased reliability and useful life for the golfer.

Yet another object of the present invention is to provide a distance measuring device that can be used on a hand pulled golf cart, or on an electric or other motorized golf cart.

Yet another object of the present invention is to provide a distance measuring device which is pre-programmable by the user to measure distance covered by the golf cart.

These objects, as well as other objects of the present invention, will become more readily apparent when reference is made to the following description and the accompanying drawings.

BRIEF DESCRIPTION OF THE DRAWINGS

FIG. 3 is an enlarged view of the face of the digital display assembly;

FIG. 4 is an enlarged perspective view of the bracket assembly which is attached to the golf cart; and FIG. 5 is a perspective view of the inventive device mounted for independent hand operation.

DETAILED DESCRIPTION

Figure 1:
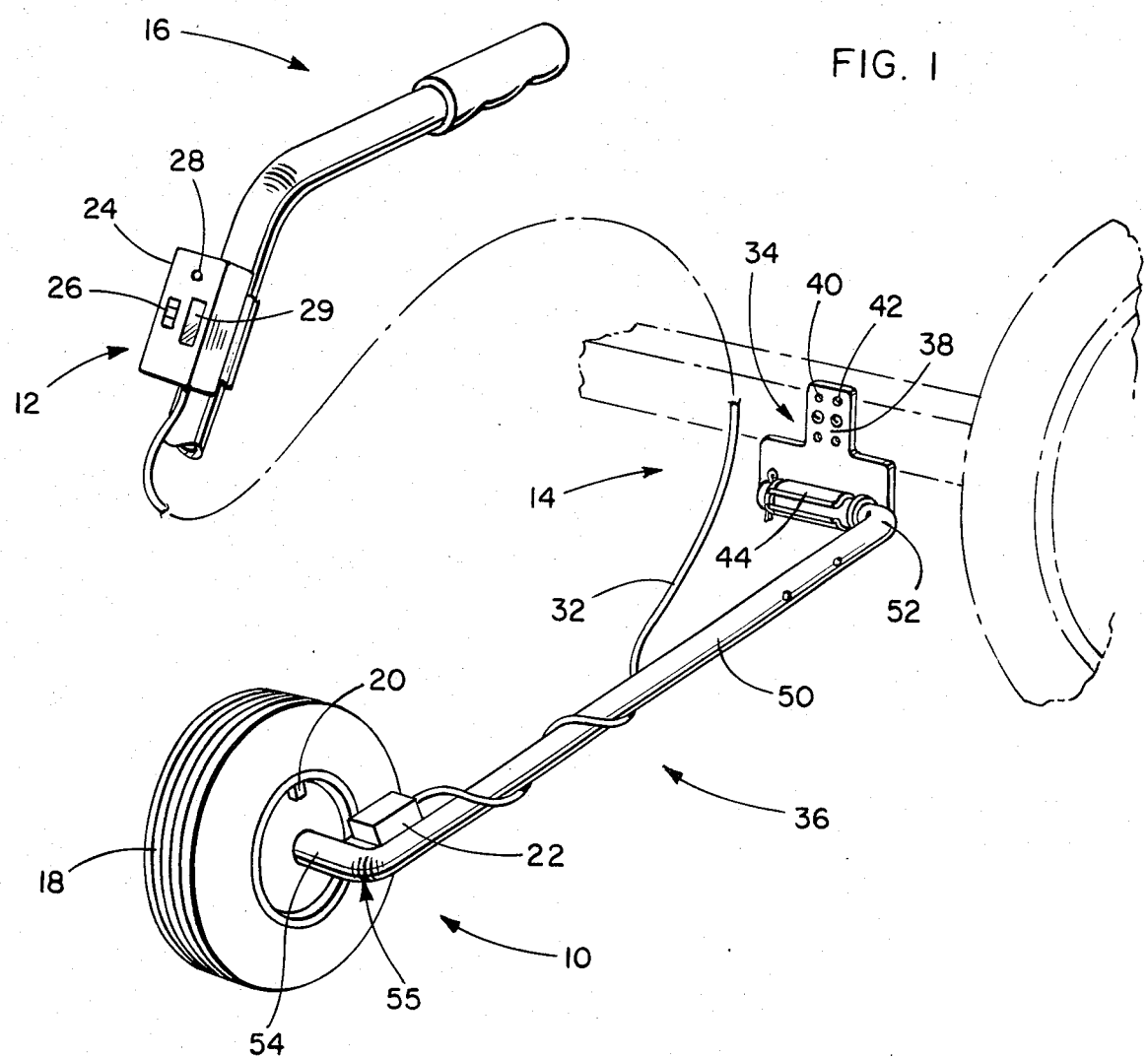
FIG. 1 is a perspective view of the present invention mounted on a golf cart.

One embodiment of the present invention is shown in FIG. 1. The device consists of three basic portions: a measuring wheel assembly 10; a digital display assembly 12; and a bracket and axle frame assembly 14 to connect the measuring wheel assembly 10 to the golf cart, which is shown generally at 16.

The measuring wheel assembly 10 comprises a fixed diameter wheel 18, the diameter in the preferred embodiment being 5.73 inches, a magnet 20, and a magnetic sensing device 22.

The digital display assembly, 12 includes a casing 24, a liquid crystal diode (LCD) display 26, a conventional electronic circuit for converting the sensed wheel revolutions (pulses from sensor 22) into display characters (not shown), a phototransistor reset sensor 28, and solar power cells 29.

Figure 2:
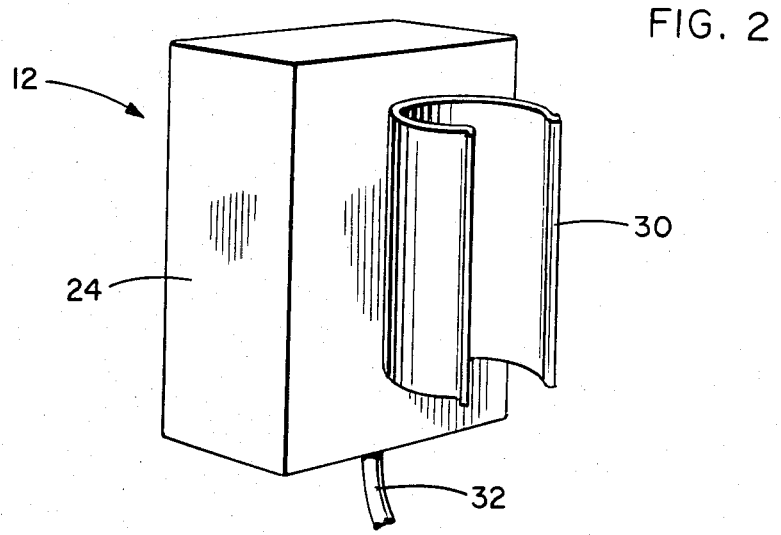
FIG. 2 is an enlarged perspective view of the backside of the digital display assembly.

FIG. 2 is an enlarged view of the digital display which shows the components in greater detail and shows a ing bracket 30 for use in attaching the display to the golf cart handle. The digital display 12 is connected to the measuring wheel 10 by means of wire or cable 32 of sufficient length to reach from the wheel assembly 10 to the display 12.

The face of the digital display assembly 12 is shown in FIG. 3. This figure illustrates the relative positions of the LCD display 26, the phototransistor reset sensor 28, and the solar cells 29. The solar cells 29 are of conventional design and are connected within the display assembly 12 to provide the necessary power to the electronic circuit. Appropriate circuitry is present to switch to a battery (not shown) as the source of power in the event that insufficient solar power is generated.

Referring to FIGS. 1 and 4, the bracket and axle assembly 14 is comprised of two pieces. A bracket 34 attaches to the golf cart and provides a place for the axle and connecting shaft 36 to be attached. The bracket 34 is formed in two portions. The first portion 38 of bracket 34 is a plate made of a light metal such as aluminum and extends upwardly to provide holes 40 and 42 for the attachment of the bracket to the golf cart, as seen best in FIG. 1. A second portion 44 of the bracket 34 takes the form of a spring clip. Spring clip 44 is formed in a conventional manner to receive the axle assembly 36 and is attached to the first bracket portion 38 by means of screws 46.

The axle and connecting shaft 36 is formed in three sections. The entire assembly is folmed from a generally cylindrical bar of rigid, sturdy plastic. The main portion of the connecting shaft is shown at 50. At each end of this main portion 50 of the connecting shaft, an axle is formed. The upper axle 52 is formed generally perpendicular to the main portion 50 of the connecting shaft. The wheel axle 54 also is formed perpendicular to the main portion of the connecting shaft 50, and is parallel to and extends in the same direction as the upper axle 52.

Upper axle 52 is attached to the golf cart by pushing it into spring clip 44. Thus, it may be rapidly attached and detached from the cart 16.

The lower axle 54 is inserted through the wheel 18 in such a manner that the wheel 18 rotates freely. This free rotation may be accomplished by the use of suitable bearings and connecting means (not shown). Also provided at the junction of the lower axle 54 and the main portion 50 of the connecting shaft is a mounting area 55 for the magnetic sensor 22. The magnetic sensor 22 is mounted and positioned in such a way that the magnet 20 passes in proximity to it so that the magnetic sensor 22 can sense the revolutions of wheel 18.

In operation, the golfer attaches the bracket 34 to the golf cart 16. The upper axle 52 of the axle and connecting shaft 36 is pushed into the spring clip 44. The permanently attached measuring wheel assembly 10 is in the operating position upon connection of the upper axle 52 to the bracket 34. The digital display assembly 12 is then secured to the handle of the golf cart 16 by means of spring bracket 30.

As the golf cart is pulled, the magnetic sensor 22 senses each passing of the magnet 20 and sends a pulse-like signal via the wire or cable 32 to digital display assembly 12. The diameter of the wheel 18 is such that it covers one yard in two revolutions. Thus, the electronic logic circuit in the digital display assembly 12 (which is conventional, and hence not shown) is such that, for every two revolutions sensed by the magnetic sensor 22, the LCD display 26 is incremented by one. At the completion of a measurement (such as the distance of a drive), or whenever the golfer wishes to reset the counter, his or her hand is passed over the phototransistor reset sensor 28 which, after a brief delay, causes the logic and the LCD display 26 to return to zero.

FIG. 5 shows the measuring device used independently from a golf cart. Extension handle 58 is attached to the main portion 50 of the connecting shaft for use in such hand-operated mode. The digital display assembly 12 is then attached to the extension handle 58 for reading by the golfer.

Figure 6:
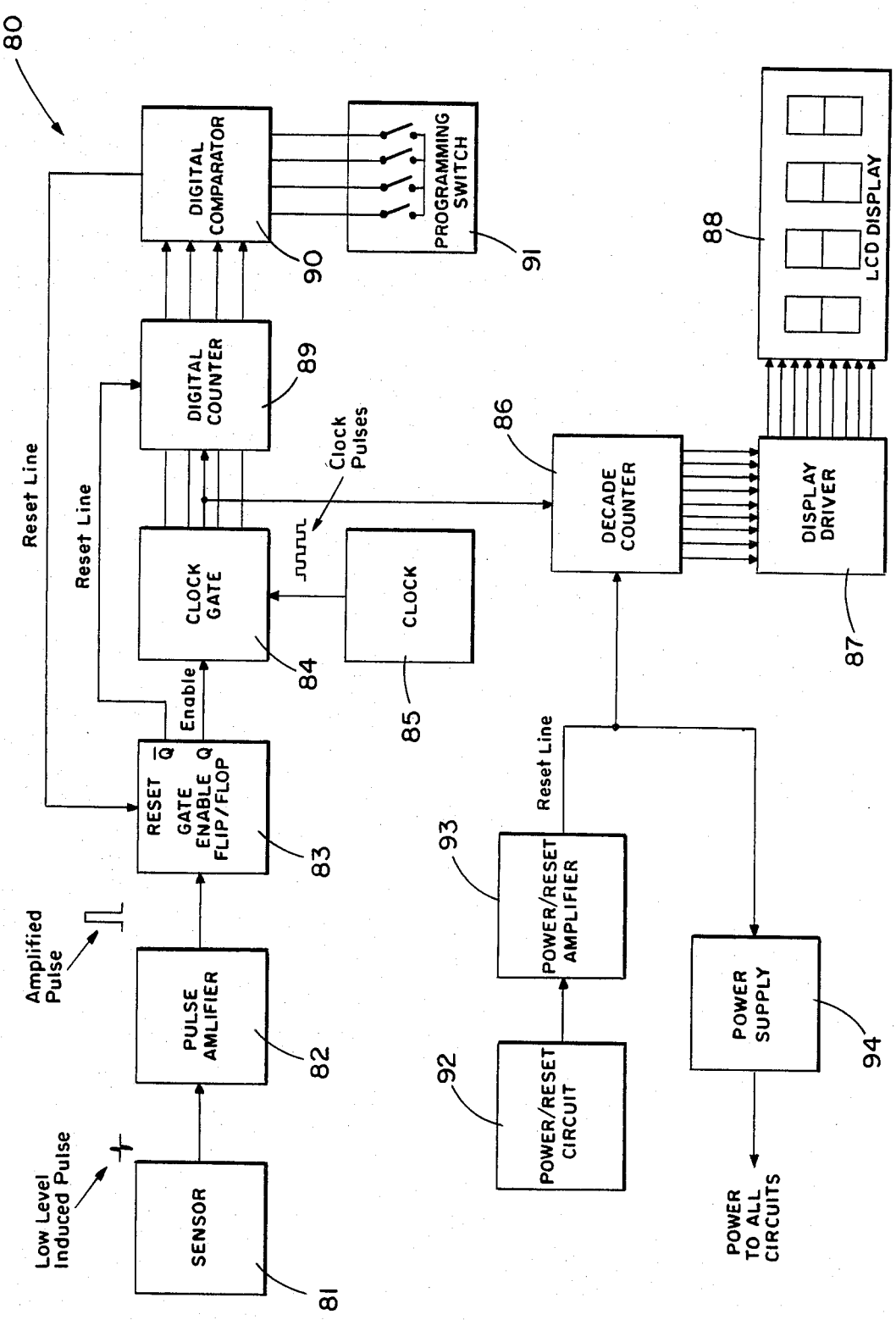
FIG. 6 is a block diagram of electronics circuitry employed in accordance with a further embodiment of the present invention.

A further embodiment of the present invention will now be described with reference to FIG. 6, which is a detailed block diagram of electronics circuitry 80 employed therewith. Basically, in accordance with this further embodiment of the distance measuring apparatus, wheel revolutions are still counted, but the electronics circuitry 80 now provided is programmable by the user. As seen in FIG. 6, the electronics circuitry 80 basically, comprises the sensor 81 (corresponding to the magnetic sensor 22 of FIG. 1), a pulse amplifier 82, gate enable flip-flop 83, clock gate 84, clock 85, decade counter 86, display driver 87, LCD display 88, digital counter 89, digital comparator 90, programming switch 91, power/reset circuit 92, power/reset amplifier 93 and power supply 94.

In operation, the sensor 81 triggers the device when the magnet 20 (FIG. 1) passes near the sensor 22. Once triggered, the electronics circuitry 80 generates a pre-programmed number of digital pulses which increment a digital LCD display 88. With each wheel rotation, the digital display 88 increments by the preset amount. The amount of incrementation is programmed by the user so as to equal the circumference of the rotating wheel in use (in accordance with a preferred embodiment, a circumference of 0.1 to 1.5 yards can be programmed). Thus, the system provides a versatile means for accurately measuring distance using an existing wheel of any known circumference.

Detailed operation of the electronics circuit 80 is as follows. Sensor 81 preferably consists of a coil placed near a rotating magnet 20 (FIG. 1) so that, when the magnet 20 passes the coil, a low-level voltage pulse is generated. This pulse is amplified and conditioned by pulse amplifier 82. The high level pulse output of pulse amplifier 82 is then provided as an input to gate enable flip-flop 83 so as to set flip-flop 83, thus enabling clock gate 84 via the Q output of flip-flop 83.

Once enabled, clock gate 84 permits clock pulses from clock 85 to pass through the gate 84 to both the decade counter 86 and digital counter 89. The decade counter 86 receives the clock pulses and is incremented in accordance therewith, providing a decimal code at its output to display driver 87. The latter processe the decimal code output to provide appropriate drive signals to the LCD display 88. Thus, the LCD display 88 indicates the numerical value of the decimal code, the latter corresponding to the number of gated clock pulses generated from the moment that the electronics circuit 80 was triggered via sensor 81.

The digital counter 89 simultaneously receives the gated clock pulses from clock 85 via clock gate 84, and is incremented in accordance therewith, providing a 4-bit binary code output to digital comparator 90. Digital comparator 90 also receives, at its other input, a preset 4-bit binary reference code set by the user based on the measured circumference of the particular wheel (for example, wheel 18 in FIG. 1) to which the magnet 20 is fixed. Thus, the programming switch circuit 91 provides a pre-programmed 4-bit binary reference code having a 16-step numerical span from 00 to 15, so that 16 possible circumferential sizes of wheels can be accommodated. Of course, the programming switch 91 can be expanded to accommodate a wider range of circumferential values, or to provide a greater number of circumferential values within a given range.

When the incrementing binary output of digital counter 89 reaches the value of the binary input from programming switch 91, digital comparator 90 generates a reset output. The latter is provided to the reset input of flip-flop 83 and resets flip-flop 83, resulting in accomplishment of two functions: (1) clock gate 84 is disabled by virtue of the Q output of flip-flop 83 going low; and (2) a reset signal from the inverted Q output of flip-flop 83 resets the digital counter 89.

As a result of disabling of the clock gate 84, clock pulses from clock 85 are no longer passed to the digital counter 89, and, as a result of the transmission of a reset input to digital counter 89, the counter 89 assumes a constant zero state, thus being prepared for the next cycle. When the next and successive pulses occur, the system functions as previously described with the exception of the operation of the decade counter 86, display driver 87 and display 88. That is to say, a subsequent pulse provided by the sensor 81 via pulse amplifier 82 sets flip-flop 83, enabling the clock gate 84, so that the clock 85 passes clock pulses to both the digital counter 89 and decade counter 86. The digital counter 89 once again counts to a predetermined value corresponding to the setting of the programming switch 91, at which point the digital comparator 90 resets the flip-flop 83, the latter disabling the clock gate 84 and resetting the digital counter 89. In the meantime, the clock pulses cause the decade counter 86, which had been previously stopped at a first value corresponding to the distance travelled during one revolution of the wheel, to advance to a second value corresponding to the distance travelled during two revolutions of the wheel. This new value is displayed on display 88 by display driver 87.

The electronics circuit 80 of FIG. 6 is provided with a special power/reset function as a result of the inclusion of power/reset circuit 92, power/reset amplifier 93 and power supply 94. The power/reset circuit 92 and power/reset amplifier 93 are included within a photosensitive switch network which, when activated by the absence of light, removes power to all other circuitry via the reset line from power/reset amplifier 93 to the power supply 94. In addition, the power/reset amplifier 93, via its reset line, resets the decade counter 86, thus resetting the display 88 to zero. Upon reactivation by virtue of the presence of light, the power/reset circuit 92 and power/reset amplifier 93 remove the reset input to power supply 94, and power is once again supplied to all circuits.

Thus, by placing a finger over the photosensor 28 (FIG. 1), the user is able to reset the display 88 to zero, and to remove power from all circuitry. A one-second delay can be provided (in a preferred embodiment), so that false resetting by absence of light for less than one second can be avoided. It should be noted that, since the automatic reset function is accomplished by virtue of detection of darkness of greater than one second in duration by the detector 28 (FIG. 1), power will be automatically removed from all circuits when the device is placed in a dark place (for example, a golf bag, glove compartment, desk drawer, etc). Finally, the power supply 94 for the system is, preferably, an ordinary 9-volt transistor battery.

It should be noted that this embodiment of the invention can be expanded in several ways. Firstly, the programming range of programming switch 91 can be easily increased by increasing the number of switches contained therein; for example, adding one additional switch and modifying the circuit's internal connections slightly can increase the programming range from 15 steps (15 separate wheel circumferences of, for example, 0.1 to 1.5 yards) to 31 steps (or 31 wheel circumferences of, for example, 0.1 to 3.1 yards).

Secondly, the programming sensitivity can be increased by increasing the number of programming switches and moving the display decimal point one digit to the left in display 88. For example, the latter modifications will increase the programming sensitivity from 0.1 yard steps to 0.01 yard steps, thus improving the sensitivity of the measuring apparatus. In this manner, the system can be programmed more closely to the wheel circumference of the golf cart wheel, thus providing greater accuracy.

Thirdly, the distance measuring range can be increased by adding additional digits to the LCD display 88, and by increasing the number of decade counters 86. For example, adding one display digit and one decade counter can increase the range from 999.9 yards to 9,999.9 yards.

Whereas the above description refers to the magnetic sensor 22 of FIG. 1 as being implemented by a coil, other sensor-type arrangements (for example, a magnetic reed switch, Hall effect switch, photosensitive devices, and the like) can be employed . In addition, the photosensitive switch 28 (FIG. 1) corresponding to the power/reset circuit 92 (FIG. 6) can be replaced by a mechanical switch, so that the user will be afforded the ability, to mechanically turn the power off.

The above description sets forth embodiments of the present invention which achieve the desired advantages and objectives thereof, but are presented for illustrative purposes only. It will be apparent to those skilled in the art that variations and modifications can be made to the specific embodiments described without departing from the spirit or the scope of the invention. Therefore, it is the intent that the present invention not be limited by the specific disclosure herein, but only by the appended claims.

What is claimed is:

1. A programmable device for measuring distance travelled by a golf cart or the like, comprising:

sensing means for sensing consecutive revolutions of a wheel, and providing corresponding consecutive sensor output signals;

programming means responsive to user operation for receiving operator input data representing a dimension of the wheel;

processing means responsive to said corresponding consecutive sensor output signals and to said operator input data from said programming means for deriving output data corresponding to distance travelled by the golf cart, said processing means including a clock proving clock pulses, a counter for counting in accordance with a clock input, a gate responsive to each occurrence of said corresponding successive sensor output signals for providing said clock pulses to said counter as said clock input thereto, causing said counter to count and to develop a count output therefrom, whereby to derive said data corresponding to said distance travelled by the golf cart; and display means responsive to said output data derived by said processing means for displaying the distance travelled by the golf cart.

2. The device as recited in claim 1, wherein said processing means further comprises an additional counter receiving said clock pulses from said gate in response to each occurrence of said corresponding successive sensor output signals, and reset circuitry connected to said programming means for disabling the gate once the additional counter has reached a count value corresponding to the operator input data of said programming means, and for resetting the count value of said additional counter to zero.

3. The device as recited in claim 1, further comprising power supply means for supplying power to said device, and reset means responsive to user operation for interrupting application of power by said power supply means to said device.

4. The device as recited in claim 3, wherein said processing means includes a clock providing clock pulses, a counter for counting in accordance with a clock input, and a gate responsive to each occurrence of said corresponding consecutive sensor output signals for providing said clock pulses to said counter as said clock input, whereby said counter counts in accordance with the distance travelled by the golf cart, and wherein said reset means is connected to said counter for resetting the count value of said counter in response to user operation of said reset means.

5. The device as recited in any one of claims 3 or 4, wherein said reset means comprises a light-sensitive device.

6. The device as recited in claim 1, further comprising solar power cells connected to the display means and to the sensing means.

* * * * *